United States Patent

Janes et al.

[15] 3,673,120

[45] June 27, 1972

[54] PERFUMERY COMPOSITIONS CONTAINING PATCHOULI OIL AND 8-CAMPHENE CARBINOL

[72] Inventors: John Francis Janes, Epping, Essex; Brian George Jaggers, Romford, Essex; Anthony John Curtis, Southsea, all of England

[73] Assignee: Bush Boake Allen Limited, London, England

[22] Filed: July 8, 1969

[21] Appl. No.: 840,029

[30] Foreign Application Priority Data

July 23, 1968 Great Britain......................35,198/68

[52] U.S. Cl. ............................................................252/522
[51] Int. Cl. ..........................................................C11b 9/00
[58] Field of Search.....................................252/522; 167/94

[56] References Cited

UNITED STATES PATENTS 3,354,225  11/1967  Kane.....................................252/522

OTHER PUBLICATIONS

Poucher, Perfumes, Cosmetics and Soaps, Vol 1, 5th Edition, 1942, D. Van Nostrand Co., Inc., N.Y., pages 322–325

Primary Examiner—Jerome D. Goldberg
Assistant Examiner—Vincent D. Turner
Attorney—Herbert H. Goodman

[57] ABSTRACT

The known compound 8-camphene carbinol has been found to act as a perfumery extender for Patchouli Oil in perfumery compositions when present in a concentration of from 1 to 200 parts by weight per 100 parts by weight of the Patchouli Oil. This extended Patchouli oil may be substituted for natural Patchouli Oil without significant impairment of aroma in many applications.

7 Claims, No Drawings

PERFUMERY COMPOSITIONS CONTAINING PATCHOULI OIL AND 8-CAMPHENE CARBINOL

This invention relates to certain perfumery compositions, namely those containing Patchouli Oil.

Compounded perfumery compositions contain a number of ingredients which may be of natural or synthetic origin. The ingredients are blended by the perfumer to create the desired odor effect. Patchouli Oil (an essential oil derived from *Pogostemon Patchouli*) has a warm aromatic spicy odor with a woody balsamic dry note. Where the perfumer wishes to include this type of note in a perfumery composition for example one of an oriental type, he will use Patchouli Oil. However, natural Oil of Patchouli is an expensive essential oil and of limited availability. Attempts have been made to simulate the odor of Patchouli Oil by a blend of synthetic perfumery chemicals, but so far this object has not been achieved.

It has now been discovered that Patchouli Oil may be diluted or extended by the incorporation therein of 8-camphene carbinol without appreciable loss of the characteristic odor effect of the Patchouli Oil. Thus, it has been discovered that 8-camphene carbinol can be used as a partial replacement for Patchouli Oil in compounded perfumery compositions.

Accordingly, the present invention comprises a compounded perfumery composition which comprises natural Oil of Patchouli with which there has been incorporated from 1 to 200 parts of 8-camphene carbinol per 100 parts of the Patchouli Oil.

8-Camphene carbinol has the chemical structure (represented in conventional terpene symbolism)

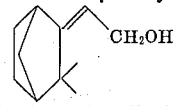

The compound has also been described as $\Delta^{3,\beta}$-camphenilane ethanol or 3,3-dimethyl-$\Delta^{2,\beta}$-norbornane ethanol. It may be obtained by a Prins type of reaction between camphene and formaldehyde, for example as described by Langlois C.A., 14, 2777, who incidentally states the compound is odorless. Thus to prepare 8-camphene carbinol camphene may be treated with formaldehyde in the presence of an acid. Often acetic acid is used and the product is then a mixture of 8-camphene carbinol and the acetate ester thereof. This mixture is then subjected to saponification and the free alcohol purified by distillation under vacuum.

The Patchouli Oil is obtained from natural sources by steam distillation of the leaves of *Pogostemon Patchouli*, which grows in such countries as Indonesia, Seychelle Islands, Malaya and China. It is used as produced or after having undergone some purification technique, such as redistillation.

The 8-camphene carbinol may be present in an amount of from 1 to 200 parts by weight per 100 parts by weight of the Patchouli Oil. Amounts of the 8-camphene carbinol at the lower end of this range, i.e., from 1 to 25 parts by weight, are best used when the 8-camphene carbinol is the sole, or substantially the sole, diluent for the Patchouli Oil. In such amounts the odor of the Patchouli Oil is affected only negligibly. Consequently the expensive Patchouli Oil has been extended by the cheaper 8-camphene carbinol. Larger proportions of 8-camphene carbinol may also be employed, but at these levels the desirable odor of Patchouli Oil may be somewhat modified. Nevertheless, the different odor effect still finds use in the formulation of compounded perfumery compositions.

Of more importance, however, is that by adding certain further perfumery components to the blend of Patchouli Oil and 8-camphene carbinol, the desirable odor of natural Patchouli Oil can be more closely simulated, but now the actual proportion of the Patchouli Oil present is much smaller. In such cases there will often be employed an amount of 25–200 parts of 8-camphene carbinol per 100 parts by weight of Patchouli Oil; an amount of 50 to 150 parts usually being optimum.

Perfumery compounds which we have found to provide this effect of "naturalizing" the odor of a blend of Patchouli Oil and 8-camphene carbinol so that it more closely simulates the effect of natural Patchouli Oil include compounds whose perfumery qualities feature in other patent applications of which we are aware. For instance there may be employed for this purpose guaioxide of the formula

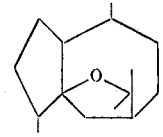

w-hydroxymethyllongifolene of the formula

and/or isolongifolene oxidate (see e.g. Netherlands Application No. 68.15455). Any or all of such components may be present in an amount of up to twice the weight of the 8-camphene carbinol employed, though usually any or all of these components will be present in an amount of up to the weight of the 8-camphene carbinol. When any or all of these components is employed an amount of at least 25 percent based on the weight of the 8-camphene carbinol is preferred.

The extended Patchouli Oil of the invention may be used in compositions where natural Patchouli Oil would have been used, for example in combination with Sandalwood Oil, Vetivert Oil, Oakmoss, Ionone, Labdanum, methyl ionone and/or synthetic substitutes thereof.

The extended Patchouli Oil will find use as a constituent of a compounded perfumery composition in which a number of perfumery materials, of natural and/or synthetic origin will be blended together to produce a particular desired odor effect. Such compositions may then be used in space sprays or can be blended in soap, detergent or deodorant compositions, including bath salts, shampoos, toilet waters, face cream, talcum powders, body lotions, sun cream preparations and shave lotions and creams. The perfumery compositions can also be used to perfume substrates such as fibers, fabrics and paper products.

The invention is illustrated by the following Examples in which all quantities are expressed on a weight basis.

EXAMPLE 1

Patchouli Oil (80 parts) obtained from the Seychelle Islands was blended with 8-camphene carbinol (20 parts). The carbinol was found to act as an extender for the Patchouli Oil in that the characteristic odor effect of the latter was only slightly modified.

EXAMPLE 2

The extended Patchouli Oil as prepared in Example 1 was successfully incorporated into a compounded composition of the Chypre type by blending the following ingredients.

|  | Parts |
|---|---|
| Cinnamic aldehyde | 1 |
| Ethyl methyl phenyl glycidate | 1 |
| Methyl nonyl acetaldehyde | 2 |
| Oakmoss (absolute) | 20 |
| Sandalwood Oil (East Indian) | 20 |
| Vetiveryl acetate | 20 |
| Yland Oil No. 1 | 20 |
| Benzoin Resoin (Sumatra) | 30 |
| Ionone (100%) | 30 |
| Clove Stem Oil (Zanzibar) | 36 |
| Bergamot Oil | 40 |
| Hydroxycitronellal | 40 |
| Iso- Eugenol | 40 |

| | Parts |
|---|---|
| Extended Patchouli Oil (Example 1) | 40 |
| Coumarin | 50 |
| Musk ketone | 50 |
| Amyl salicylate | 60 |
| Cedarwood Oil (American) | 60 |
| Citronellol | 60 |
| Benzyl acetate | 80 |
| Phenyl ethyl alcohol | 150 |
| Terpinyl acetate | 150 |
| | 1000 |

EXAMPLE 3

A Patchouli Oil Extender base was prepared by blending the following ingredients.

| | Parts |
|---|---|
| 8-camphene carbinol | 38 |
| Guaioxide | 27 |
| Isolongifolene oxidate | 20 |
| w-Hydroxymethyl longifolene | 10 |
| Cedrol | 3 |
| Sandalwood Oil (East Indian) | 2 |
| | 100 |

This mixture (46 parts) was then blended with natural Patchouli Oil (Seychelles) (60 parts) to provide a satisfactory extended Patchouli Oil.

EXAMPLE 4

The extended Patchouli Oil prepared in Example 3 was incorporated into a compounded perfumery composition of the Fougere type containing the following ingredients.

| | Parts |
|---|---|
| Balsam (Peru) | 30 |
| Labdanum Resoin | 30 |
| Oakmoss (absolute) | 30 |
| Sandalwood Oil (East Indian) | 30 |
| Linalyl acetate | 40 |
| Terpinyl acetate | 40 |
| Geranium Oil (Bourbon) | 50 |
| Musk ambrette | 50 |
| Coumarin | 60 |
| Amyl salicylate | 60 |
| Methyl ionone | 70 |
| Cedarwood Oil (American) | 80 |
| Clove Stem Oil (Zanzibar) | 80 |
| Vetivert Oil (Bourbon) | 80 |
| Extended Patchouli Oil (Example 3) | 130 |
| Lavandin Oil | 140 |
| | 1000 |

We claim:

1. A compounded perfumery composition which comprises natural Oil of Patchouli with which there has been incorporated from 1 to 200 parts by weight of 8-camphene carbinol per 100 parts by weight of the Patchouli Oil.

2. A composition as claimed in claim 1 wherein the 8-camphene carbinol is present in a concentration of from 1 to 25 parts by weight per 100 parts by weight of the Patchouli Oil.

3. A composition as claimed in claim 1, wherein said composition also contains an effective amount of a further perfumery ingredient selected from the group consisting of Sandalwood Oil, Vetivert oil, Oakmoss, Ionone, Labdanum, and methyl ionone.

4. A composition as claimed in claim 1 wherein the 8-camphene carbinol is present in a concentration of from 25–200 parts by weight per 100 parts by weight of the Patchouli Oil and wherein said composition also contains at least one additional compound selected from the group consisting of guaioxide, w-hydroxymethyl-longifolene and isolongifolene oxidate in an amount up to twice the weight of the 8-camphene carbinol in said composition.

5. A composition as claimed in claim 4 wherein said additional compound is present in an amount of at least 25 percent based on the weight of the 8-camphene carbinol in said composition.

6. A composition as claimed in claim 5 wherein the 8-camphene carbinol is present in an amount of 50–150 parts by weight per 100 parts by weight of Patchouli Oil.

7. A composition as claimed in claim 6, wherein said additional compound is present in an amount of up to the weight of the 8-camphene carbinol in said composition.

* * * * *